United States Patent
Choi et al.

(10) Patent No.: US 11,110,962 B2
(45) Date of Patent: Sep. 7, 2021

(54) REAR CHASSIS MODULE FOR VEHICLE

(71) Applicants: HYUNDAI MOTOR COMPANY, Seoul (KR); KIA MOTORS CORPORATION, Seoul (KR)

(72) Inventors: Seong Eun Choi, Hwaseong-si (KR); Kun Ho Park, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 198 days.

(21) Appl. No.: 16/581,001

(22) Filed: Sep. 24, 2019

(65) Prior Publication Data

US 2020/0231216 A1  Jul. 23, 2020

(30) Foreign Application Priority Data

Jan. 23, 2019  (KR) ........................ 10-2019-0008728

(51) Int. Cl.
| | | |
|---|---|---|
| *B60J 7/00* | (2006.01) | |
| *B62D 21/15* | (2006.01) | |
| *B62D 21/11* | (2006.01) | |
| *B62D 25/08* | (2006.01) | |
| *B60R 19/12* | (2006.01) | |
| *B60K 1/04* | (2019.01) | |
| *B60G 7/02* | (2006.01) | |
| *B60R 19/34* | (2006.01) | |

(52) U.S. Cl.
CPC ............ *B62D 21/155* (2013.01); *B62D 21/11* (2013.01); *B62D 25/08* (2013.01); *B60G 7/02* (2013.01); *B60G 2204/15* (2013.01); *B60K 1/04* (2013.01); *B60K 2001/0438* (2013.01); *B60R 19/12* (2013.01); *B60R 19/34* (2013.01)

(58) Field of Classification Search
CPC .......... A61F 13/49011; A61F 13/49017; A61F 13/49061; A61F 13/496; A61F 13/51478; B62D 21/11; B62D 25/087; B65H 2511/10; B65H 2220/01; A63B 60/52
See application file for complete search history.

(56) References Cited

U.S. PATENT DOCUMENTS

| | | | | |
|---|---|---|---|---|
| 3,638,748 A | * | 2/1972 | Tixier ...................... | B60K 5/00 180/232 |
| 4,469,339 A | * | 9/1984 | Watanabe .............. | B60K 15/04 280/834 |
| 4,488,732 A | * | 12/1984 | Lehmann ............. | B62D 21/186 280/781 |

(Continued)

FOREIGN PATENT DOCUMENTS

JP  2011-46257 A  3/2011

*Primary Examiner* — Kiran B Patel
(74) *Attorney, Agent, or Firm* — Morgan, Lewis & Bockius LLP

(57) ABSTRACT

A rear chassis module for a vehicle includes: a rear suspension subframe disposed under a rear floor panel; a pair of front reinforcing members extending from the rear suspension subframe toward the front of the vehicle, and supporting a battery pack; a pair of rear reinforcing members extending from the rear suspension subframe toward the rear of the vehicle, and supporting a fuel tank; a pair of rear floor side members disposed on both sides of the rear floor panel; and a rear crossmember transverse to and connected to the pair of rear floor side members.

13 Claims, 10 Drawing Sheets

(56) References Cited

U.S. PATENT DOCUMENTS

| | | | | |
|---|---|---|---|---|
| 4,514,008 A * | 4/1985 | Watanabe | B60K 15/073 | |
| | | | 280/835 | |
| 4,787,643 A * | 11/1988 | Shirata | B60K 15/03504 | |
| | | | 123/519 | |
| 5,110,177 A * | 5/1992 | Akio | B62D 21/11 | |
| | | | 280/784 | |
| 5,174,628 A * | 12/1992 | Hayatsugu | B60K 15/03 | |
| | | | 296/187.11 | |
| 5,364,128 A * | 11/1994 | Ide | B60G 7/02 | |
| | | | 280/784 | |
| 5,410,980 A * | 5/1995 | Wardavoir | B60F 3/003 | |
| | | | 440/12.5 | |
| 5,419,609 A * | 5/1995 | Kmiec | B62D 21/152 | |
| | | | 296/187.11 | |
| 5,445,404 A * | 8/1995 | Shida | B60G 9/04 | |
| | | | 280/124.116 | |
| 5,562,308 A * | 10/1996 | Kamei | B60G 3/20 | |
| | | | 180/377 | |
| 5,829,824 A * | 11/1998 | Yamamuro | B60N 2/686 | |
| | | | 296/204 | |
| 6,086,103 A * | 7/2000 | Fukagawa | B60K 15/07 | |
| | | | 280/830 | |
| 6,676,183 B2 * | 1/2004 | Yoshida | B62D 21/15 | |
| | | | 280/781 | |
| 6,953,099 B2 * | 10/2005 | Kawasaki | B60K 1/04 | |
| | | | 180/65.1 | |
| 7,331,611 B2 * | 2/2008 | Kusu | B60K 13/04 | |
| | | | 180/309 | |
| 7,568,755 B2 | 8/2009 | Imada et al. | | |
| 8,033,353 B2 * | 10/2011 | Sawauchi | F02M 25/0854 | |
| | | | 180/69.4 | |
| 8,070,217 B2 | 12/2011 | Matsuura et al. | | |
| 8,267,468 B2 * | 9/2012 | Amir | B60R 22/22 | |
| | | | 296/193.08 | |
| 8,286,980 B2 * | 10/2012 | Onda | B60G 3/285 | |
| | | | 280/124.128 | |
| 8,480,165 B2 * | 7/2013 | Koyama | B62D 25/2027 | |
| | | | 296/203.04 | |
| 8,522,910 B2 * | 9/2013 | Asai | B60K 13/04 | |
| | | | 180/309 | |
| 8,567,543 B2 | 10/2013 | Kubota et al. | | |
| 8,585,132 B2 | 11/2013 | Klimek et al. | | |
| 8,857,836 B2 * | 10/2014 | Okuyama | B60G 7/02 | |
| | | | 280/124.109 | |
| 9,045,170 B2 * | 6/2015 | Rumpel | B60G 3/20 | |
| 9,079,620 B2 * | 7/2015 | Komiya | B62D 21/11 | |
| 9,139,229 B2 * | 9/2015 | Mikami | B60K 15/01 | |
| 9,254,874 B2 * | 2/2016 | De Luca | B62D 25/087 | |
| 9,308,805 B2 | 4/2016 | Shiromura et al. | | |
| 9,682,727 B2 * | 6/2017 | Tanaka | B60G 3/20 | |
| 10,202,028 B1 * | 2/2019 | Jarocki | B62D 21/152 | |
| 2009/0026802 A1 | 1/2009 | Imada et al. | | |
| 2010/0301637 A1 * | 12/2010 | Matsuura | B62D 21/152 | |
| | | | 296/204 | |
| 2011/0011654 A1 * | 1/2011 | Kubota | B60K 15/063 | |
| | | | 180/65.21 | |
| 2011/0068606 A1 | 3/2011 | Klimek et al. | | |
| 2014/0008137 A1 * | 1/2014 | Shiromura | B60L 58/21 | |
| | | | 180/68.5 | |
| 2019/0276093 A1 * | 9/2019 | Tatsuwaki | B62D 21/152 | |
| 2020/0108874 A1 * | 4/2020 | Koike | B60K 15/067 | |

* cited by examiner

REAR CHASSIS MODULE FOR VEHICLE

CROSS-REFERENCE TO RELATED APPLICATION

This application is based on and claims the benefit of priority to Korean Patent Application No. 10-2019-0008728, filed on Jan. 23, 2019 in the Korean Intellectual Property Office, the entire disclosure of which is incorporated herein by reference.

TECHNICAL FIELD

The present disclosure relates to a rear chassis module for a vehicle, and more particularly, to a rear chassis module for a vehicle capable of safely protecting rear-mounted components such as a battery and a fuel tank, and improving crashworthiness in a rear impact.

BACKGROUND

In general, eco-friendly vehicles such as hybrid vehicles include rear-mounted components that require safety performance such as a battery pack and a fuel tank, and the rear-mounted components may be disposed under a rear floor of a vehicle body.

Such rear-mounted components must be safely protected from rear impacts. In particular, reinforcing structures and mounting parts for securing the safety performance of the rear-mounted components may be individually mounted.

In conventional eco-friendly vehicles, however, the above-described rear-mounted components, reinforcing structures, mounting parts, and the like are individually mounted on the rear floor, and accordingly it is difficult to ensure the crashworthiness of the vehicle in the rear impact, and assembly man-hour and assembly time are excessively required.

In addition, the eco-friendly vehicle includes a bumper back beam mounted on a rear panel of the vehicle body to cope with a rear impact. The bumper back beam is mounted to the rear panel of the vehicle body through a pair of crash boxes, and a pair of rear floor side members is disposed on the rear floor of the vehicle. The crash boxes are connected to the rear floor side members, respectively. An impact load generated in the rear impact of the vehicle is transmitted and absorbed to the respective rear floor side members via the bumper back beam and the crash boxes.

However, since the conventional rear structure absorbs impact energy by only using a vehicle body side load path defined by the bumper back beam, the crash boxes, and the rear floor side members in the rear impact, it fails to actively utilize rear tires and the like, which are located outside the rear floor side members, as an impact absorbing space. In particular, when both side load paths of the vehicle body are not utilized due to an offset impact or the like, the fuel tank and the battery may be damaged due to excessive deformation of the rear floor side members and peripheral portions.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a rear chassis module for a vehicle capable of safely protecting rear-mounted components such as a battery and a fuel tank, and improving crashworthiness in a rear impact.

According to an aspect of the present disclosure, a rear chassis module for a vehicle may include: a rear suspension subframe disposed under a rear floor panel; a pair of front reinforcing members extending from the rear suspension subframe toward a front of the vehicle, and supporting a battery pack; a pair of rear reinforcing members extending from the rear suspension subframe toward a rear of the vehicle, and supporting a fuel tank; a pair of rear floor side members disposed on both sides of the rear floor panel; and a rear crossmember transverse to and connected to the pair of rear floor side members.

The rear floor panel may include a tunnel disposed in a central portion thereof, and a pair of tunnel-side side members disposed on both sides of the tunnel, the pair of front reinforcing members may connect the rear suspension subframe to the pair of tunnel-side side members, and each of the pair of rear reinforcing members may connect the rear suspension subframe and the rear crossmember to each other.

front ends of the pair of front reinforcing members may be directly coupled to rear ends of the pair of tunnel-side side members, respectively, and rear ends of the pair of front reinforcing members may be coupled to the rear suspension subframe.

Each of the pair of front reinforcing members may include a straight portion supporting a bottom surface of the battery pack, and an inclined portion extending from the straight portion and being inclined with respect to the straight portion, the straight portion may be directly coupled to the bottom surface of the battery pack, and the inclined portion may be spaced apart from a rear end of the battery pack.

The rear chassis module may further include a plurality of battery support members attached to a bottom surface of the battery pack, wherein one end of each of the plurality of battery support members may be coupled to a respective one of the pair of front reinforcing members and to the bottom surface of the battery pack, and another end of each of the plurality of battery support members may be coupled to a respective one of the pair of rear floor side members.

Front ends of the pair of rear reinforcing members may be coupled to the rear suspension subframe, and rear ends of the pair of rear reinforcing members may be coupled to the rear crossmember.

Each of the pair of rear reinforcing members may include a straight portion supporting a bottom surface of the fuel tank, and an inclined portion extending from the straight portion and being inclined with respect to the straight portion, the straight portion may be directly coupled to the bottom surface of the fuel tank, and the inclined portion may be spaced apart from a rear end of the fuel tank.

A pair of support members may be coupled to portions of the rear crossmember adjacent to respective ends of the rear crossmember, and the pair of support members may connect the rear crossmember to the pair of rear floor side members in a diagonal direction.

Front ends of the pair of support members may be respectively coupled to the pair of rear floor side members, and rear ends of the pair of support members may be coupled to rear ends of the pair of rear reinforcing members, respectively, and to the rear crossmember.

Front ends of the pair of support members may be coupled to a rear end of a rear mounting member of the rear suspension subframe and respectively coupled to the pair of rear floor side members.

The rear floor panel may include a tunnel disposed in a central portion thereof, a pair of tunnel-side side members disposed on both sides of the tunnel, and a pair of exterior-side side members spaced apart from the pair of tunnel-side side members in a direction toward an exterior of the rear floor panel, respectively, the pair of front reinforcing members may connect the rear suspension subframe to the pair of exterior-side side members, and each of the pair of rear reinforcing members may connect the rear suspension subframe and the rear crossmember to each other.

A rear end of each of the pair of rear reinforcing members may be connected to the rear crossmember by a bracket.

The rear chassis module may further include: a rear bumper back beam connected to a rear end of the rear floor panel through a crash box; and a lower rear bumper back beam disposed below the rear bumper back beam, wherein the rear reinforcing member may include an extension portion extending from the rear crossmember toward the rear of the vehicle, and the extension portion may be directly coupled to the lower rear bumper back beam.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
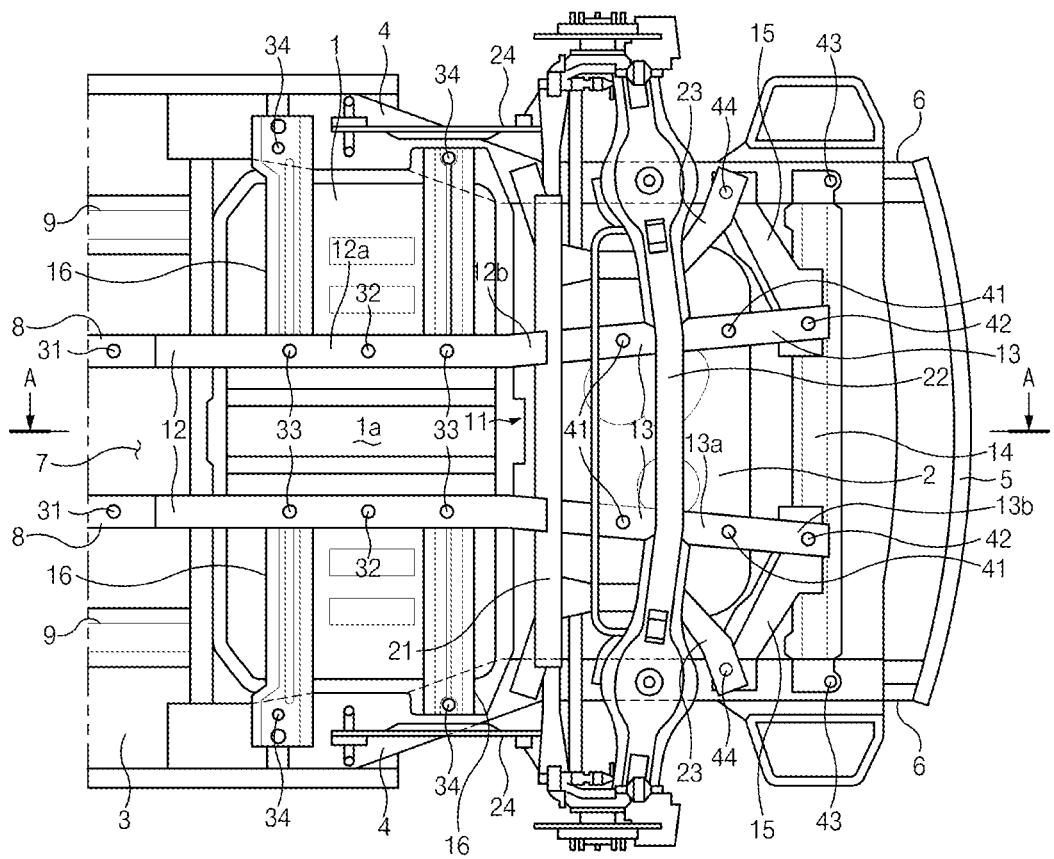
FIG. 1 illustrates a plan view of a rear chassis module for a vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
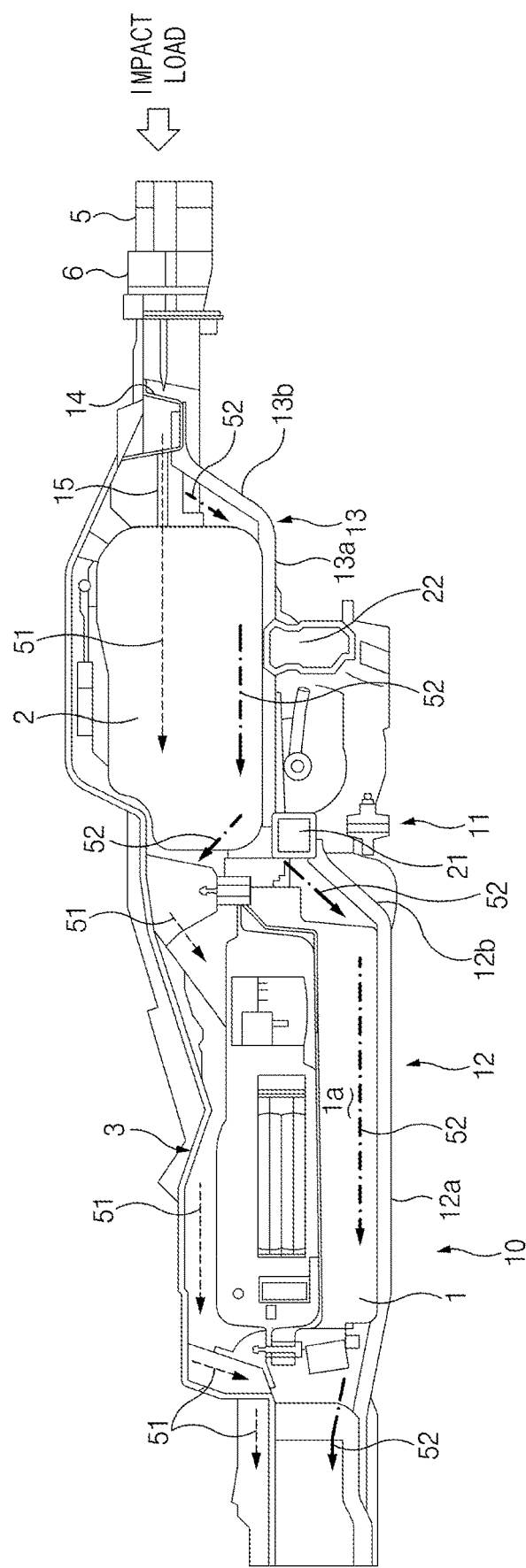
FIG. 2 illustrates a cross-sectional view taken along line A-A of FIG. 1.

Referring to FIGS. 1 and 2, a rear chassis module 10 for a vehicle according to an exemplary embodiment of the present disclosure may include a rear suspension subframe 11, a pair of front reinforcing members 12 extending from the rear suspension subframe 11 toward the front of the vehicle, and a pair of rear reinforcing members 13 extending from the rear suspension subframe 11 toward the rear of the vehicle.

Referring to FIGS. 1 and 2, the rear suspension subframe 11 may be disposed under a rear floor panel 3, and the rear suspension subframe 11 may be connected to rear wheels of the vehicle.

The rear floor panel 3 may include a tunnel 7 formed in a central portion thereof, a pair of tunnel-side side members 8 disposed on both sides of the tunnel 7, and a pair of exterior-side side members 9 spaced apart from the tunnel-side side members 8 toward the exterior of the vehicle, respectively.

As illustrated in FIG. 2, a battery pack 1 and a fuel tank 2 may be disposed under the rear floor panel 3. The battery pack 1 may be disposed to be adjacent to the tunnel 7, and the fuel tank 2 may be disposed behind the battery pack 1. The battery pack 1 may have a tunnel groove 1a aligned with the tunnel 7, so that a pipe, a tube, a shaft, and the like may pass through the tunnel 7 and the tunnel groove 1a of the battery pack 1.

A pair of rear floor side members 4 may be disposed on both sides of the rear floor panel 3, and a rear bumper back beam 5 may be connected to a rear end of the rear floor panel 3 through a crash box 6. The rear bumper back beam 5 and the crash box 6 may be made of (ultra) high tensile steel with impact performance (or strength performance).

The rear suspension subframe 11 may include a first traverse member 21 and a second traverse member 22 spaced apart from the first traverse member 21. The first traverse member 21 and the second traverse member 22 may be disposed under the fuel tank 2, and the second traverse member 22 may be disposed behind the first traverse member 21. A rear mounting member 23 and a front mounting member 24 may be connected to the first traverse member 21. A rear end of the rear mounting member 23 and a front end of the front mounting member 24 may be coupled to the rear floor side member 4.

The pair of front reinforcing members 12 may be spaced apart from each other in a width direction of the vehicle, and each front reinforcing member 12 may extend in a longitudinal direction of the vehicle. The pair of front reinforcing members 12 may be parallel to each other. The front reinforcing member 12 may support a bottom surface of the battery pack 1.

The front reinforcing member 12 may connect the rear suspension subframe 11 and the tunnel-side side member 8 of the rear floor panel 3. A front end of the front reinforcing member 12 may be coupled to the tunnel-side side member 8 of the rear floor panel 3 through a first fastening point 31. The first fastening point 31 may refer to a point at which the front end of the front reinforcing member 12 and a rear end of the tunnel-side side member 8 of the rear floor panel 3 are fastened by using fasteners, welding, and/or the like. A rear end of the front reinforcing member 12 may be coupled to the first traverse member 21 of the rear suspension subframe 11 by welding and/or the like.

As illustrated in FIG. 2, the front reinforcing member 12 may include a straight portion 12a supporting the bottom surface of the battery pack 1, and an inclined portion 12b extending from the straight portion 12a inclined with respect to the straight portion 12a. The straight portion 12a may be directly coupled to the bottom surface of the battery pack 1 so that the straight portion 12a may stably support the battery pack 1, and the inclined portion 12b may be opposite to and spaced apart from a rear end of the battery pack 1 so that the inclined portion 12b may cover the rear end of the battery pack 1.

The straight portion 12a of the front reinforcing member 12 may be coupled to the bottom surface of the battery pack 1 through a second fastening point 32. The second fastening point 32 may refer to a point at which the straight portion 12a of the front reinforcing member 12 and the bottom surface of the battery pack 1 are fastened by using fasteners, welding, and/or the like. A rear end of the inclined portion 12b of the front reinforcing member 12 may be coupled to the first traverse member 21 of the rear suspension subframe 11 by welding and/or the like. The straight portion 12a of the front reinforcing member 12 may be coupled to the bottom surface of the battery pack 1, and the inclined portion 12b of the front reinforcing member 12 may be disposed to cover the rear end of the battery pack 1, thereby protecting the battery pack 1 stably.

A plurality of battery support members 16 supporting the battery pack 1 may be attached to the bottom surface of the battery pack 1. Each battery support member 16 may extend in the width direction of the vehicle, and the battery support member 16 may be orthogonal to the front reinforcing member 12.

One end of the battery support member 16 may be coupled to the straight portion 12a of the front reinforcing member 12 and the bottom surface of the battery pack 1 through a third fastening point 33. The third fastening point 33 may refer to a point at which one end of the battery support member 16, the straight portion 12a of the front reinforcing member 12, and the bottom surface of the battery pack 1 are fastened by using fasteners, welding, and/or the like. Another end of the battery support member 16 may be coupled to the rear floor side member 4 through a fourth fastening point 34. The fourth fastening point 34 may refer to a point at which the another end of the battery support member 16 and the rear floor side member 4 are fastened by using fasteners, welding, and/or the like. Both ends of the battery support member 16 may be coupled to the front reinforcing member 12 and the rear floor side member 4 so that the battery pack 1 may be firmly supported.

The front end of the front reinforcing member 12 may be connected to the tunnel-side side member 8 of the rear floor panel 3, and the rear end of the front reinforcing member 12 may be connected to the first traverse member 21 of the rear suspension subframe 11. The battery support members 16 and the battery pack 1 may be firmly supported to the rear floor side members 4 by the pair of front reinforcing members 12 so that a safety area for protecting the battery pack 1 may be sufficiently secured. Thus, a vehicle body or the fuel tank 2 deformed in a rear impact may be prevented from colliding with or contacting the battery pack 1 so that the battery pack 1 may be protected safely.

The pair of rear reinforcing members 13 may be spaced apart from each other in the width direction of the vehicle, and each rear reinforcing member 13 may extend in the longitudinal direction of the vehicle. The rear reinforcing member 13 may support a bottom surface of the fuel tank 2.

The rear reinforcing member 13 may connect the rear suspension subframe 11 and a rear crossmember 14. A front end of the rear reinforcing member 13 may be coupled to the first traverse member 21 of the rear suspension subframe 11 by welding and/or the like, and a central portion of the rear reinforcing member 13 may be coupled to the second traverse member 22 of the rear suspension subframe 11 by welding and/or the like. The rear crossmember 14 may be transverse to and connected to the pair of rear floor side members 4 and the pair of rear reinforcing member 13, and portions of the rear crossmember 14 adjacent to both ends of the rear crossmember 14 may be coupled to rear ends of the rear reinforcing members 13 by welding and/or the like. A pair of support members 15 may be individually coupled to the portions of the rear crossmember 14 adjacent to respective ends of the rear crossmember 14. Each support member 15 may connect the rear crossmember 14 and the rear floor side member 4 in a diagonal direction. A front end of the support member 15 may be coupled to the rear floor side member 4, and a rear end of the support member 15 together with the rear end of the rear reinforcing member 13 may be coupled to the rear crossmember 14. The rear crossmember 14 may be firmly supported to the rear floor side members 4 by the pair of support members 15, and the pair of rear reinforcing members 13 may be firmly supported to the rear crossmember 14.

As illustrated in FIG. 2, the rear reinforcing member 13 may include a straight portion 13a supporting the bottom surface of the fuel tank 2, and an inclined portion 13b extending from the straight portion 13a and being inclined with respect to the straight portion 13a. The straight portion 13a may be directly coupled to the bottom surface of the fuel tank 2 so that the straight portion 13a may stably support the fuel tank 2, and the inclined portion 13b may be spaced apart from a rear end of the fuel tank 2 so that the inclined portion 13b may cover the rear end of the fuel tank 2.

The straight portion 13a of the rear reinforcing member 13 may be coupled to the bottom surface of the fuel tank 2 through a fifth fastening point 41. The fifth fastening point 41 may refer to a point at which the straight portion 13a of the rear reinforcing member 13 and the bottom surface of the fuel tank 2 are fastened by using fasteners, welding, and/or the like. A rear end of the inclined portion 13b of the rear reinforcing member 13 may be coupled to the rear crossmember 14 and the rear end of the support member 15 through a sixth fastening point 42. The sixth fastening point 42 may refer to a point at which the inclined portion 13b of the rear reinforcing member 13, the rear crossmember 14, and the support member 15 are fastened by using fasteners, welding, and/or the like. The straight portion 13a of the rear reinforcing member 13 may be coupled to the bottom surface of the fuel tank 2, and the inclined portion 13b of the rear reinforcing member 13 may be disposed to cover the rear end of the fuel tank 2, thereby protecting the fuel tank 2 stably.

Both ends of the rear crossmember 14 may be coupled to rear ends of the pair of rear floor side members 4 through seventh fastening points 43, respectively. The seventh fastening point 43 may refer to a point at which the end of the rear crossmember 14 and the rear end of the rear floor side member 4 are fastened by using fasteners, welding, and/or the like.

The front end of the support member 15 together with the rear end of the rear mounting member 23 of the rear suspension subframe 11 may be coupled to the rear floor side member 4 through an eighth fastening point 44. The eighth fastening point 44 may refer to a point at which the front end of the support member 15, the rear end of the rear mounting member 23, and the rear floor side member 4 are fastened by using fasteners, welding, and/or the like.

The front end of the rear reinforcing member 13 may be connected to the rear suspension subframe 11, and the rear end of the rear reinforcing member 13 may be connected to the rear crossmember 14. The fuel tank 2 may be supported to the rear floor side members 4 by the pair of rear reinforcing members 13, the rear crossmember 14, and the pair of support members 15 so that a safety area for protecting the fuel tank 2 may be sufficiently secured. Thus, the vehicle body deformed in a rear impact may be prevented from colliding with or contacting the fuel tank 2 so that the fuel tank 2 may be protected safely.

As described above, the rear chassis module 10 for a vehicle according to an exemplary embodiment of the present disclosure may be disposed under the rear floor panel 3, and the rear-mounted components such as the battery pack 1 and the fuel tank 2 may be disposed between the rear chassis module 10 and the rear floor panel 3 so that a vehicle body side load path 51 may be formed above the rear-mounted components, and a chassis side load path 52 may be formed below the rear-mounted components. The vehicle body side load path 51 may be defined by the rear floor panel 3 and the rear floor side member 4, and the chassis side load path 52 may be defined by the rear suspension subframe 11, the front reinforcing members 12, the rear reinforcing members 13, the rear crossmember 14, the support members 15, and the battery support members 16. An impact load generated in the rear impact of the vehicle may be primarily absorbed by the rear bumper back beam 5 and the crash box 6, and be secondarily distributed or absorbed by the vehicle body side load path 51 and the chassis side load path 52. Thus, deformation of the vehicle body may be effectively prevented so that damage to the fuel tank and the battery pack may be prevented, and impact energy transmitted to a passenger compartment may be sufficiently absorbed so that impact safety performance may be improved.

In addition, after the battery pack 1 and the fuel tank 2 are pre-assembled to the front reinforcing members 12 and the rear reinforcing members 13 of the rear chassis module 10, they may be assembled to the rear floor panel 3 of the vehicle body at one time. Thus, the process efficiency and productivity may be improved. In particular, since it is not necessary to change or modify an existing production line, the investment cost and production cost may be reduced.

Figure 3:
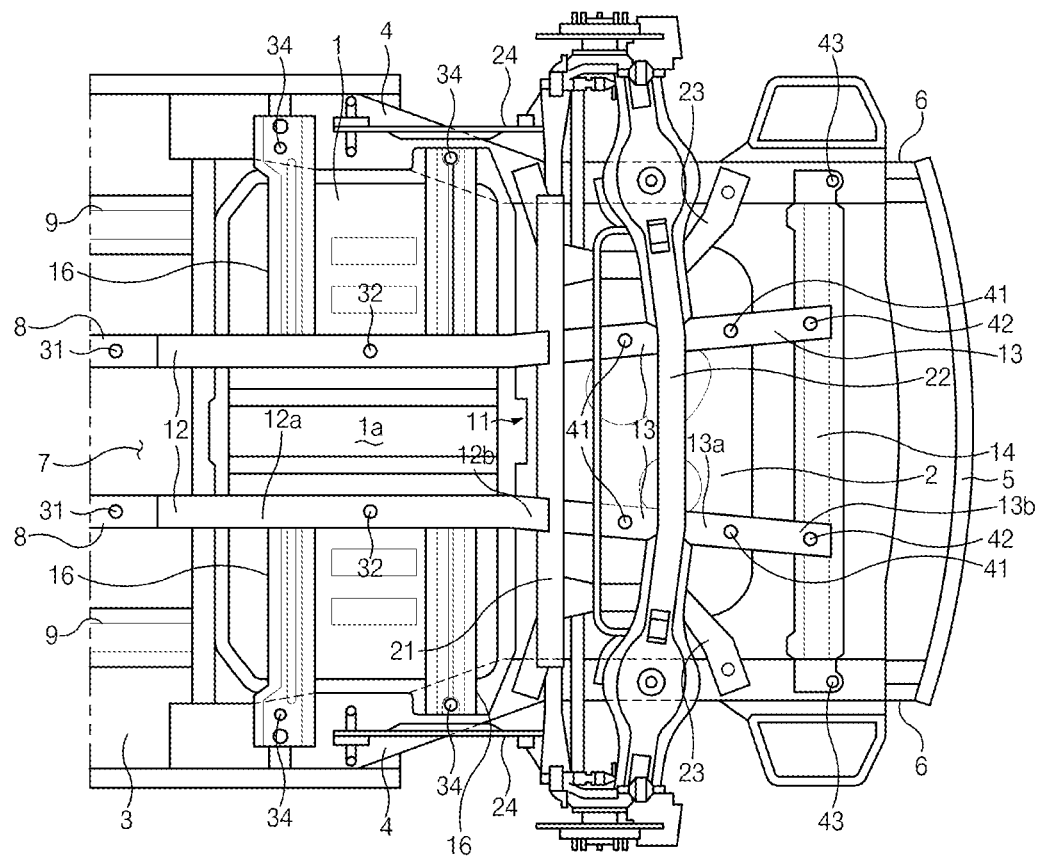
FIG. 3 illustrates a modification to the exemplary embodiment of FIG. 1.

FIG. 3 illustrates a modification to the exemplary embodiment of FIG. 1. Here, the third fastening point 33 may be eliminated. Accordingly, the front reinforcing members 12 and the battery support members 16 may not be fastened together to the bottom surface of the battery pack 1, and the battery support members 16 may be directly fastened to the bottom surface of the battery pack 1. In addition, the support members 15 may be eliminated, and accordingly the eighth fastening point 44 at which the front end of the support member 15 and the rear mounting member 23 are fastened together may be eliminated.

Figure 4:
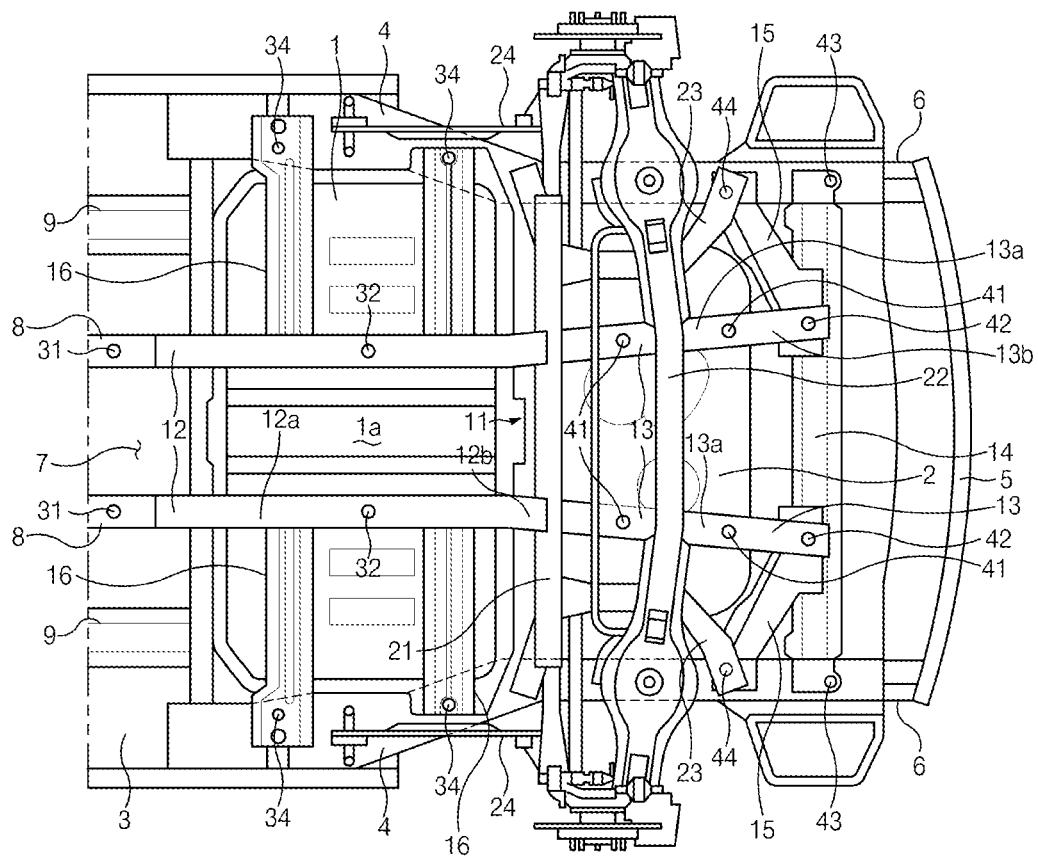
FIG. 4 illustrates another modification to the exemplary embodiment of FIG. 1.

FIG. 4 illustrates a modification to the exemplary embodiment of FIG. 1. Here, the third fastening point 33 may be eliminated. Accordingly, the front reinforcing members 12 and the battery support members 16 may not be fastened together to the bottom surface of the battery pack 1, and the battery support members 16 may be directly fastened to the bottom surface of the battery pack 1.

Figure 5:
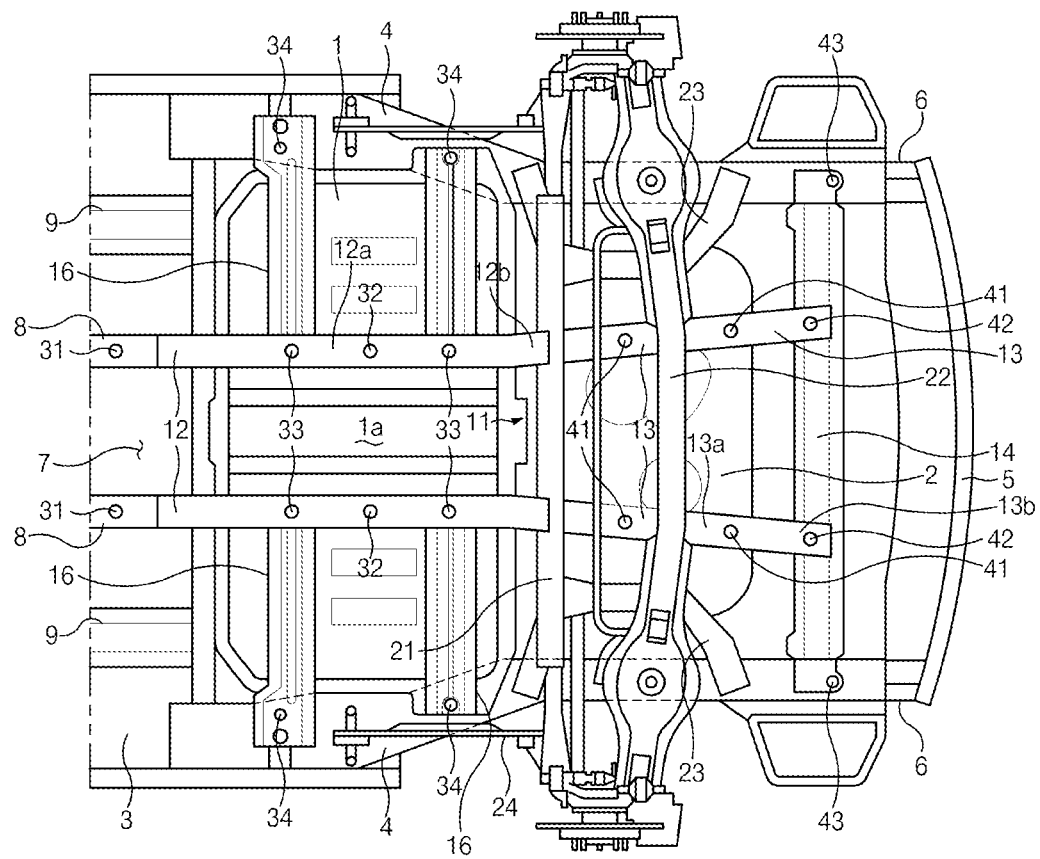
FIG. 5 illustrates another modification to the exemplary embodiment of FIG. 1.

FIG. 5 illustrates a modification to the exemplary embodiment of FIG. 1. Here, the support members 15 may be eliminated, and accordingly the eighth fastening point 44 at which the front end of the support member 15 and the rear mounting member 23 are fastened together may be eliminated.

Figure 6:
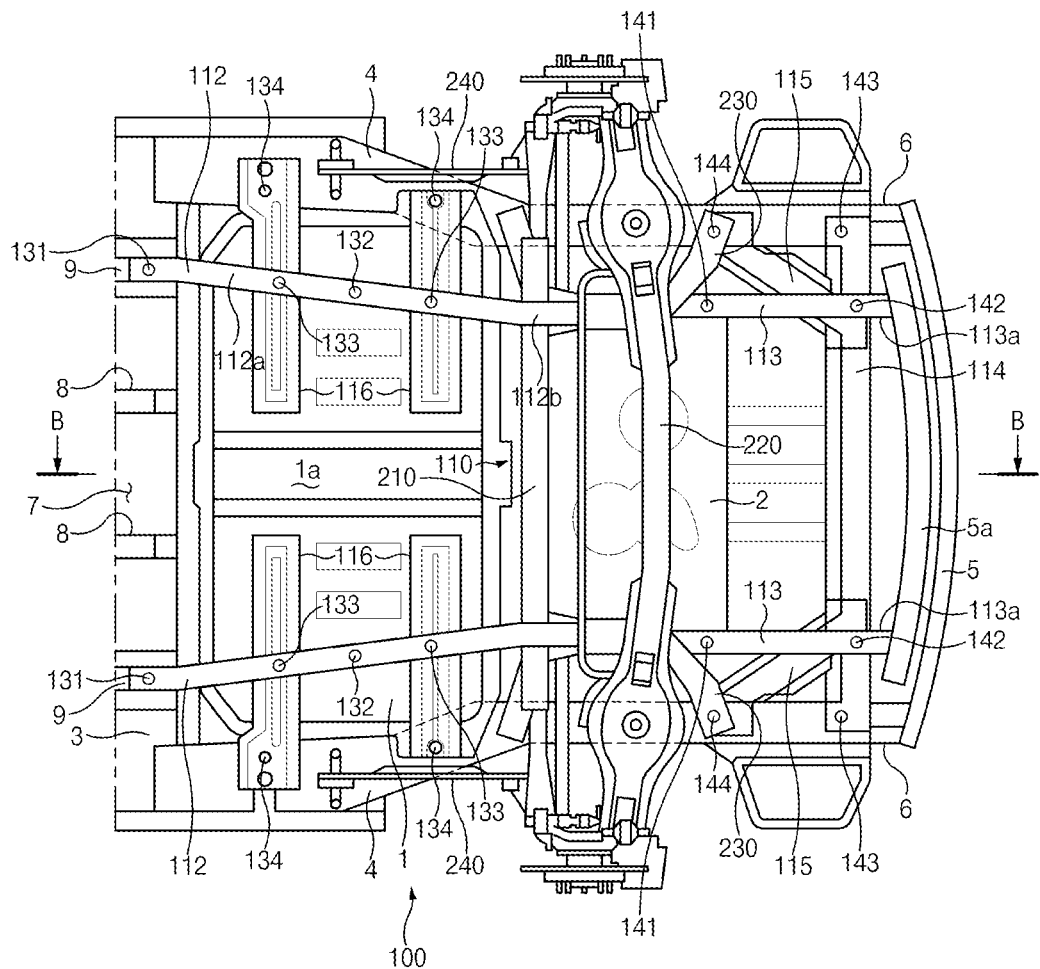
FIG. 6 illustrates a plan view of a rear chassis module for a vehicle according to another exemplary embodiment of the present disclosure.
Figure 7:
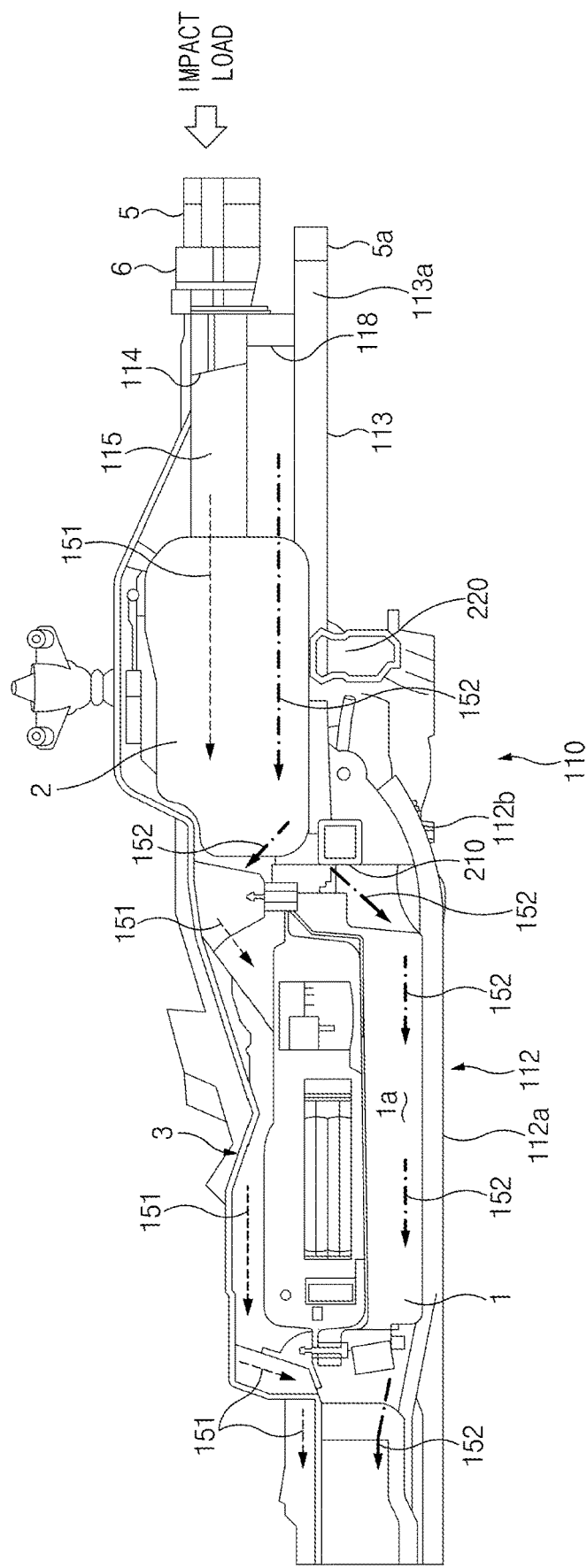
FIG. 7 illustrates a cross-sectional view taken along line B-B of FIG. 6.

Referring to FIGS. 6 and 7, a rear chassis module 100 for a vehicle according to an exemplary embodiment of the present disclosure may include a rear suspension subframe 110, a pair of front reinforcing members 112 extending from the rear suspension subframe 110 toward the front of the vehicle, and a pair of rear reinforcing members 113 extending from the rear suspension subframe 110 toward the rear of the vehicle.

Referring to FIGS. 6 and 7, the rear suspension subframe 110 may be disposed under the rear floor panel 3, and the rear suspension subframe 110 may be connected to rear wheels of the vehicle.

The rear floor panel 3 may include the tunnel 7 formed in the central portion thereof, the pair of tunnel-side side members 8 disposed on both sides of the tunnel 7, and the pair of exterior-side side members 9 spaced apart from the tunnel-side side members 8 toward the exterior of the vehicle, respectively.

As illustrated in FIG. 7, the battery pack 1 and the fuel tank 2 may be disposed under the rear floor panel 3. The battery pack 1 may be disposed to be adjacent to the tunnel 7, and the fuel tank 2 may be disposed behind the battery pack 1. The battery pack 1 may have the tunnel groove 1a aligned with the tunnel 7, so that a pipe, a tube, a shaft, and the like may pass through the tunnel 7 and the tunnel groove 1a of the battery pack 1.

The pair of rear floor side members 4 may be disposed on both sides of the rear floor panel 3, and the rear bumper back beam 5 may be connected to the rear end of the rear floor panel 3 through the crash box 6.

The rear suspension subframe 110 may include a first traverse member 210 and a second traverse member 220 spaced apart from the first traverse member 210. The first traverse member 210 and the second traverse member 220 may be disposed under the fuel tank 2, and the second traverse member 220 may be disposed behind the first traverse member 210. A rear mounting member 230 and a front mounting member 240 may be connected to the first traverse member 210. A rear end of the rear mounting member 230 and a front end of the front mounting member 240 may be coupled to the rear floor side member 4.

The pair of front reinforcing members 112 may be spaced apart from each other in the width direction of the vehicle, and each front reinforcing member 112 may support the bottom surface of the battery pack 1.

The front reinforcing member 112 may connect the rear suspension subframe 110 and the exterior-side side member 9 of the rear floor panel 3. A front end of the front reinforcing member 112 may be coupled to the exterior-side side member 9 of the rear floor panel 3 through a first fastening point 131. Each front reinforcing member 112 may extend in a diagonal direction, and a gap between the pair of front reinforcing members 112 may be narrower at the rear of the vehicle than at the front of the vehicle. The first fastening point 131 may refer to a point at which the front end of the front reinforcing member 112 and a rear end of the exterior-side side member 9 of the rear floor panel 3 are fastened by using fasteners, welding, and/or the like. A rear end of the front reinforcing member 112 may be coupled to the rear suspension subframe 110 by welding and/or the like.

As illustrated in FIG. 7, the front reinforcing member 112 may include a straight portion 112a supporting the bottom surface of the battery pack 1, and an inclined portion 112b extending from the straight portion 112a inclined with respect to the straight portion 112a. The straight portion 112a may be directly coupled to the bottom surface of the battery pack 1 so that the straight portion 112a may stably support the battery pack 1, and the inclined portion 112b may be opposite to and spaced apart from the rear end of the battery pack 1 so that the inclined portion 112b may cover the rear end of the battery pack 1.

The straight portion 112a of the front reinforcing member 112 may be coupled to the bottom surface of the battery pack 1 through a second fastening point 132. The second fastening point 132 may refer to a point at which the straight portion 112a of the front reinforcing member 112 and the bottom surface of the battery pack 1 are fastened by using fasteners, welding, and/or the like. A rear end of the inclined portion 112b of the front reinforcing member 112 may be coupled to the rear suspension subframe 110 by welding and/or the like. The straight portion 112a of the front reinforcing member 112 may be coupled to the bottom surface of the battery pack 1, and the inclined portion 112b of the front reinforcing member 112 may be disposed to cover the rear end of the battery pack 1, thereby protecting the battery pack 1 stably.

A plurality of battery support members 116 supporting the battery pack 1 may be attached to the bottom surface of the battery pack 1. Each battery support member 116 may extend in the width direction of the vehicle, and the battery support member 16 may be orthogonal to the front reinforcing member 112.

One end of the battery support member 116 may be coupled to the straight portion 112a of the front reinforcing member 112 and the bottom surface of the battery pack 1 through a third fastening point 133. The third fastening point 133 may refer to a point at which one end of the battery support member 116, the straight portion 112a of the front reinforcing member 112, and the bottom surface of the battery pack 1 are fastened by using fasteners, welding, and/or the like. Another end of the battery support member 116 may be coupled to the rear floor side member 4 through a fourth fastening point 134. The fourth fastening point 134 may refer to a point at which the another end of the battery support member 116 and the rear floor side member 4 are fastened by using fasteners, welding, and/or the like. Both ends of the battery support member 116 may be coupled to the front reinforcing member 112 and the rear floor side member 4 so that the battery pack 1 may be firmly supported.

The front end of the front reinforcing member 112 may be connected to the exterior-side side member 9 of the rear floor panel 3, and the rear end of the front reinforcing member 112 may be connected to the rear suspension subframe 110. The battery support members 116 and the battery pack 1 may be firmly supported to the rear floor side members 4 by the pair of front reinforcing members 112 so that a safety area for protecting the battery pack 1 may be sufficiently secured. Thus, the vehicle body or the fuel tank 2 deformed in a rear impact may be prevented from colliding with or contacting the battery pack 1 so that the battery pack 1 may be protected safely.

The pair of rear reinforcing members 113 may be spaced apart from each other in the width direction of the vehicle, and each rear reinforcing member 113 may extend in the longitudinal direction of the vehicle. The rear reinforcing member 113 may support the bottom surface of the fuel tank 2.

The rear reinforcing member 113 may connect the rear suspension subframe 110 and a rear crossmember 114. A front end of the rear reinforcing member 113 may be coupled to the second traverse member 220 of the rear suspension subframe 110 by welding and/or the like. As illustrated in FIG. 7, each rear reinforcing member 113 may extend straightly. The rear reinforcing member 113 may be coupled to the bottom surface of the fuel tank 2 so that the rear reinforcing member 113 may stably support the fuel tank 2, and a rear end of the rear reinforcing member 113 may be connected to the rear crossmember 114 by a bracket 118. The bracket 118 may be opposite to and spaced apart from the rear end of the fuel tank 2 so that the bracket 118 may cover the rear end of the fuel tank 2.

In addition, the rear reinforcing member 113 may further include an extension portion 113a extending from the rear crossmember 114 toward the rear of the vehicle. The extension portion 113a of the rear reinforcing member 113 may be directly coupled to a lower rear bumper back beam 5a. As illustrated in FIG. 6, the lower rear bumper back beam 5a may be disposed in front of the rear bumper back beam 5, and as illustrated in FIG. 7, the lower rear bumper back beam 5a may be disposed below the rear bumper back beam 5.

A support member 115 may connect the rear crossmember 114 and the rear floor side member 4 in a diagonal direction. A front end of the support member 115 may be directly coupled to the rear floor side member 4, and a rear end of the support member 115 may be directly coupled to the rear crossmember 114. The rear crossmember 114 may be firmly supported to the rear floor side members 4 by the support members 115, and the rear reinforcing members 113 may be firmly supported to the rear crossmember 114.

The rear reinforcing member 113 may be coupled to the bottom surface of the fuel tank 2 through a fifth fastening point 141. The fifth fastening point 141 may refer to a point at which the rear reinforcing member 113 and the bottom surface of the fuel tank 2 are fastened by using fasteners, welding, and/or the like. The rear end of the rear reinforcing member 113 may be coupled to the bracket 118, the rear end of the support member 115, and the rear crossmember 114 through a sixth fastening point 142. The sixth fastening point 142 may refer to a point at which the rear reinforcing member 113, the bracket 118, the rear crossmember 114, and the support member 115 are fastened by using fasteners, welding, and/or the like. The rear reinforcing member 113 may be directly coupled to the bottom surface of the fuel tank 2, and the bracket 118 of the rear reinforcing member 113 may be disposed to cover the rear end of the fuel tank 2, thereby protecting the fuel tank 2 stably.

Both ends of the rear crossmember 114 may be coupled to rear ends of the pair of rear floor side members 4 through seventh fastening points 143, respectively. The seventh fastening point 143 may refer to a point at which the end of the rear crossmember 114 and the rear end of the rear floor side member 4 are fastened by using fasteners, welding, and/or the like.

The front end of the support member 115 together with the rear end of the rear mounting member 230 of the rear suspension subframe 110 may be coupled to the rear floor side member 4 through an eighth fastening point 144. The eighth fastening point 144 may refer to a point at which the front end of the support member 115, the rear end of the rear mounting member 230, and the rear floor side member 4 are fastened by using fasteners, welding, and/or the like.

The front end of the rear reinforcing member 113 may be connected to the rear suspension subframe 110, and the rear end of the rear reinforcing member 113 may be connected to the rear crossmember 114. The fuel tank 2 may be supported to the rear floor side members 4 by the pair of rear reinforcing members 113, the rear crossmember 114, and the pair of support members 115 so that a safety region for protecting the fuel tank 2 may be sufficiently secured. Thus, the vehicle body deformed in a rear impact may be prevented from colliding with or contacting the fuel tank 2 so that the fuel tank 2 may be protected safely.

As described above, the rear chassis module 100 for a vehicle according to the exemplary embodiment of the present disclosure may be disposed under the rear floor panel 3, and the rear-mounted components such as the battery pack 1 and the fuel tank 2 may be disposed between the rear chassis module 100 and the rear floor panel 3 so that a vehicle body side load path 151 may be formed above the rear-mounted components, and a chassis side load path 152 may be formed below the rear-mounted components. The vehicle body side load path 151 may be defined by the rear floor panel 3 and the rear floor side member 4, and the chassis side load path 152 may be defined by the rear suspension subframe 110, the front reinforcing members 112, the rear reinforcing members 113, the rear crossmember 114, the support members 115, and the battery support members 116. An impact load generated in the rear impact of the vehicle may be primarily absorbed by the rear bumper back beam 5 and the crash box 6, and be secondarily distributed or absorbed by the vehicle body side load path 151 and the chassis side load path 152. Thus, deformation of the vehicle body may be effectively prevented so that damage to the fuel tank and the battery pack may be prevented, and impact energy transmitted to the passenger compartment may be sufficiently absorbed so that impact safety performance may be improved.

In addition, after the battery pack 1 and the fuel tank 2 are pre-assembled to the front reinforcing members 112 and the rear reinforcing members 113 of the rear chassis module 100, they may be assembled to the rear floor panel 3 of the vehicle body at one time. Thus, the process efficiency and productivity may be improved. In particular, since it is not necessary to change or modify an existing production line, the investment cost and production cost may be reduced.

Figure 8:
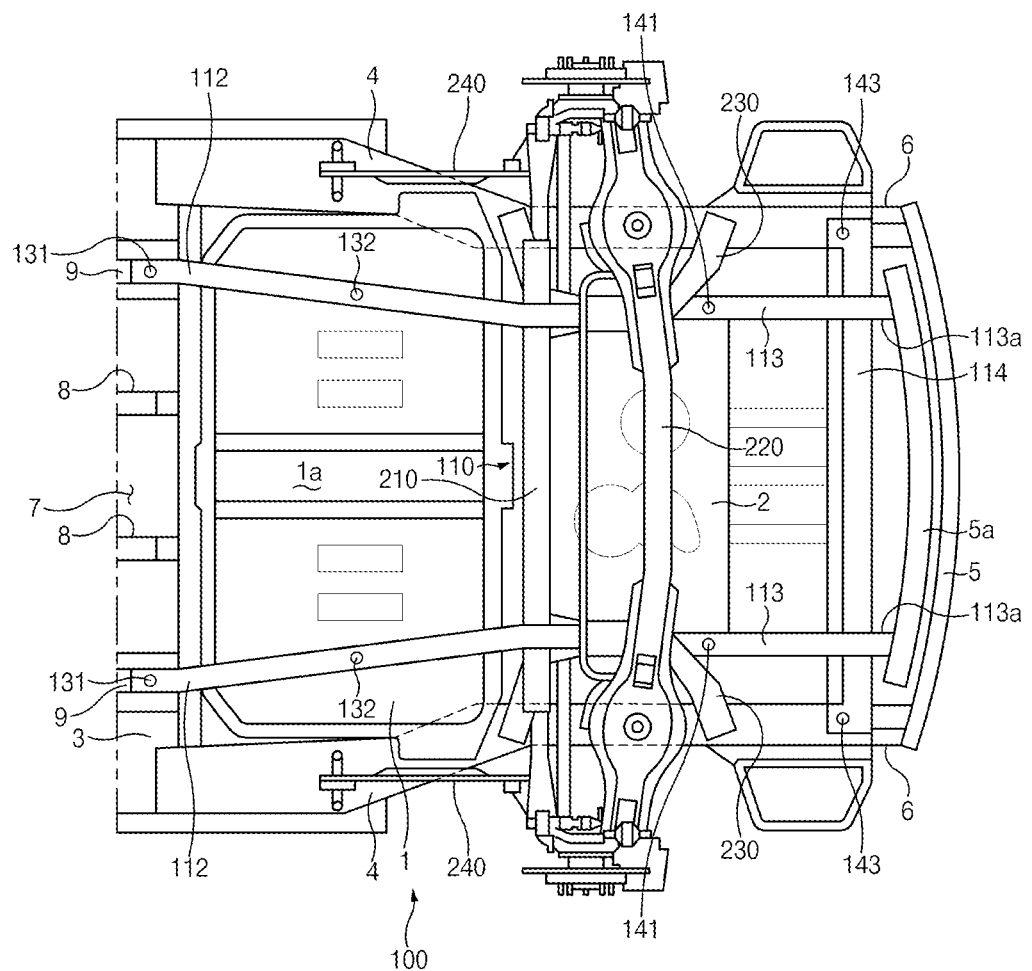
FIG. 8 illustrates a modification to the exemplary embodiment of FIG. 6.

FIG. 8 illustrates a modification to the exemplary embodiment of FIG. 6. Here, the battery support member 116 may be eliminated, and accordingly the third fastening point 133 may be eliminated. In addition, the support member 115 may be eliminated, and accordingly the sixth fastening point 142 and the eighth fastening point 144 may be eliminated.

Figure 9:
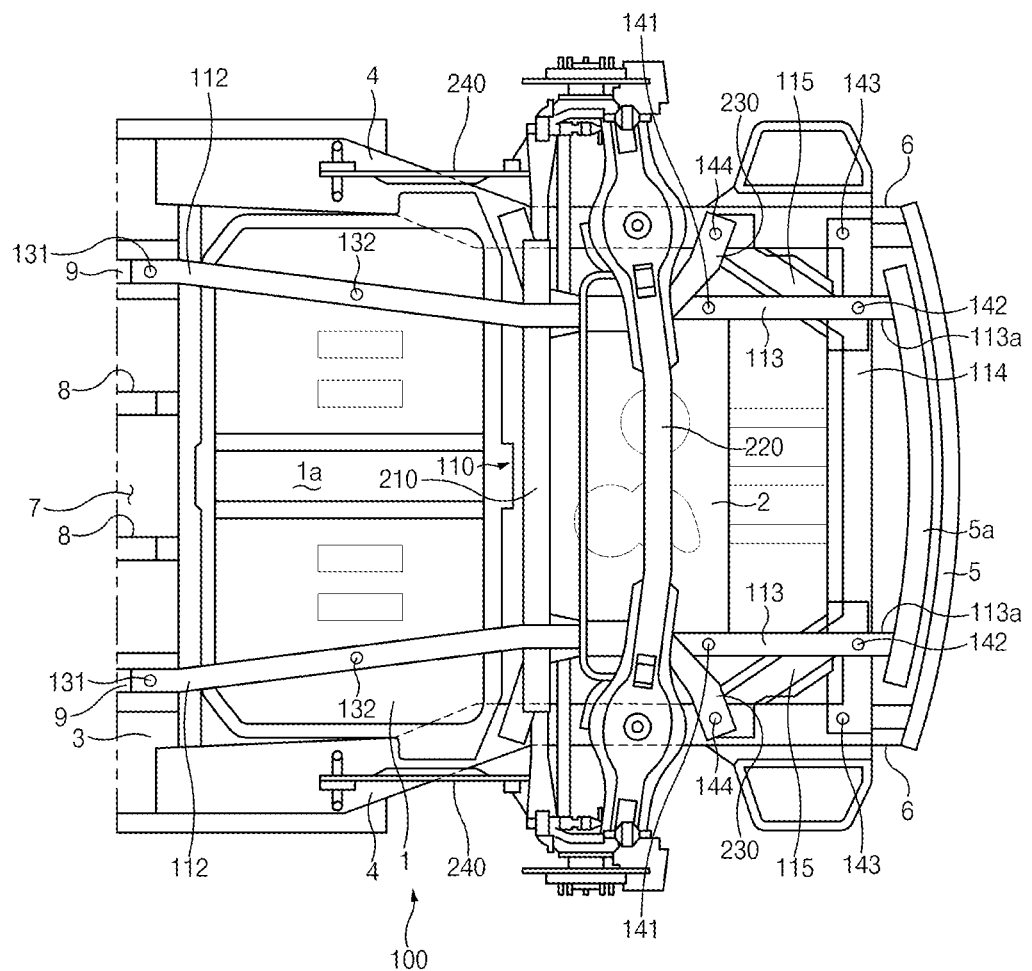
FIG. 9 illustrates another modification to the exemplary embodiment of FIG. 6.

FIG. 9 illustrates a modification to the exemplary embodiment of FIG. 6. Here, the battery support member 116 may be eliminated, and accordingly the third fastening point 133 may be eliminated.

Figure 10:
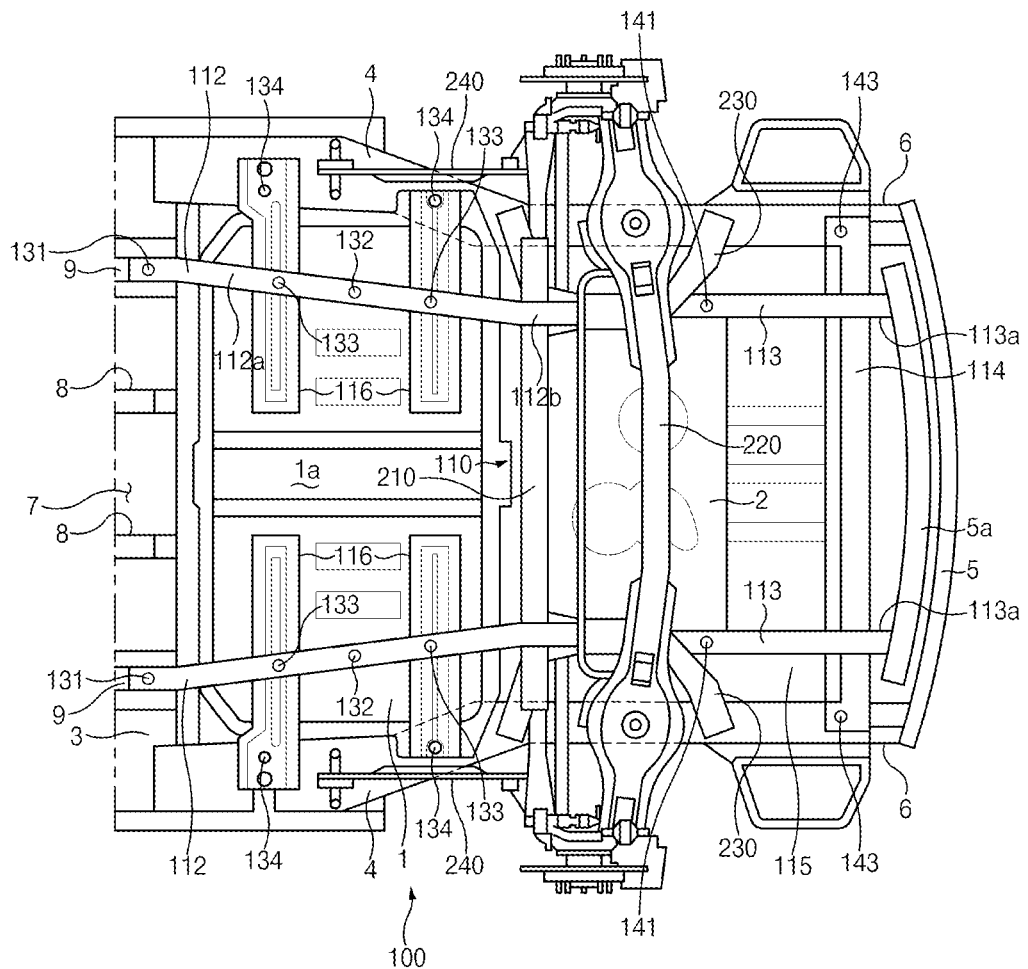
FIG. 10 illustrates another modification to the exemplary embodiment of FIG. 6.

FIG. 10 illustrates a modification to the exemplary embodiment of FIG. 6. Here, the support member 115 may be eliminated, and accordingly the sixth fastening point 142 and the eighth fastening point 144 may be eliminated.

As set forth above, the rear chassis module according to exemplary embodiments of the present disclosure may safely protect the rear-mounted components such as the battery and the fuel tank, and improve crashworthiness in the rear impact.

According to exemplary embodiments of the present disclosure, the vehicle body side load path may be formed above the rear-mounted components, and the chassis side load path may be formed below the rear-mounted components. The impact load generated in the rear impact of the vehicle may be uniformly distributed or absorbed by the vehicle body side load path and the chassis side load path. Thus, the deformation of the vehicle body may be effectively prevented so that damage to the fuel tank and the battery pack mounted on the rear of the vehicle may be prevented, and the impact energy transmitted to the passenger compartment may be sufficiently absorbed so that the impact safety performance may be improved.

According to exemplary embodiments of the present disclosure, after the battery pack and the fuel tank are pre-assembled, they may be assembled to the rear floor panel of the vehicle body at one time. Thus, the process efficiency and productivity may be improved. In particular, since it is not necessary to change or modify the existing production line, the investment cost and production cost may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A rear chassis module for a vehicle, the rear chassis module comprising:
    a rear suspension subframe disposed under a rear floor panel;
    a pair of front reinforcing members extending from the rear suspension subframe toward a front of the vehicle, and supporting a battery pack;
    a pair of rear reinforcing members extending from the rear suspension subframe toward a rear of the vehicle, and supporting a fuel tank;
    a pair of rear floor side members disposed on both sides of the rear floor panel; and
    a rear crossmember transverse to and connected to the pair of rear floor side members.

2. The rear chassis module according to claim 1, wherein the rear floor panel includes a tunnel disposed in a central portion thereof, and a pair of tunnel-side side members disposed on both sides of the tunnel,
    the pair of front reinforcing members connect the rear suspension subframe to the pair of tunnel-side side members, and
    each of the pair of rear reinforcing members connects the rear suspension subframe and the rear crossmember to each other.

3. The rear chassis module according to claim 2, wherein front ends of the pair of front reinforcing members are directly coupled to rear ends of the pair of tunnel-side side members, respectively, and
    rear ends of the pair of front reinforcing members are coupled to the rear suspension subframe.

4. The rear chassis module according to claim 1, wherein each of the pair of front reinforcing members includes a straight portion supporting a bottom surface of the battery pack, and an inclined portion extending from the straight portion and being inclined with respect to the straight portion, the straight portion is directly coupled to the bottom surface of the battery pack, and the inclined portion is spaced apart from a rear end of the battery pack.

5. The rear chassis module according to claim 1, further comprising a plurality of battery support members attached to a bottom surface of the battery pack, wherein one end of each of the plurality of battery support members is coupled to a respective one of the pair of front reinforcing members and to the bottom surface of the battery pack, and another end of each of the plurality of battery support members is coupled to a respective one of the pair of rear floor side members.

6. The rear chassis module according to claim 1, wherein front ends of the pair of rear reinforcing members are coupled to the rear suspension subframe, and rear ends of the pair of rear reinforcing members are coupled to the rear crossmember.

7. The rear chassis module according to claim 1, wherein each of the pair of rear reinforcing members includes a straight portion supporting a bottom surface of the fuel tank, and an inclined portion extending from the straight portion and being inclined with respect to the straight portion, the straight portion is directly coupled to the bottom surface of the fuel tank, and the inclined portion is spaced apart from a rear end of the fuel tank.

8. The rear chassis module according to claim 1, wherein a pair of support members are coupled to portions of the rear crossmember adjacent to respective ends of the rear crossmember, and the pair of support members connects the rear crossmember to the pair of rear floor side members in a diagonal direction.

9. The rear chassis module according to claim 8, wherein front ends of the pair of support members are respectively coupled to the pair of rear floor side members, and rear end of the pair of support members are coupled to rear ends of the pair of rear reinforcing members, respectively, and to the rear crossmember.

10. The rear chassis module according to claim 8, wherein front ends of the pair of support members are coupled to a rear end of a rear mounting member of the rear suspension subframe and respectively coupled to the pair of rear floor side members.

11. The rear chassis module according to claim 1, wherein the rear floor panel includes a tunnel disposed in a central portion thereof, a pair of tunnel-side side members disposed on both sides of the tunnel, and a pair of exterior-side side members spaced apart from the pair of tunnel-side side members in a direction toward an exterior of the vehicle, respectively, the pair of front reinforcing members connect the rear suspension subframe to the pair of exterior-side side members, and each of the pair of rear reinforcing members connects the rear suspension subframe and the rear crossmember to each other.

12. The rear chassis module according to claim 11, wherein a rear end of each of the pair of rear reinforcing members is connected to the rear crossmember by a bracket.

13. The rear chassis module according to claim 12, further comprising:

a rear bumper back beam connected to a rear end of the rear floor panel through a crash box; and a lower rear bumper back beam disposed below the rear bumper back beam, wherein the rear reinforcing member includes an extension portion extending from the rear crossmember toward the rear of the vehicle, and the extension portion is directly coupled to the lower rear bumper back beam.

* * * * *